United States Patent [19]
Arai

[11] 3,895,389
[45] July 15, 1975

[54] MECHANISM AND NETWORK FOR EFFECTING THE SEQUENCING OF AN ELECTRIC MOTOR DRIVEN FILM ADVANCING SHUTTER COCKING AND RELEASE MECHANISM

[75] Inventor: Akihiro Arai, Tokyo, Japan

[73] Assignee: Asahi Kogaku Kogyo Kabushiki Kaisha, Tokyo, Japan

[22] Filed: July 17, 1973

[21] Appl. No.: 380,047

[30] Foreign Application Priority Data
July 27, 1972   Japan................................ 47-74610

[52] U.S. Cl................................. 354/173; 354/204
[51] Int. Cl. .......................................... G03b 19/04
[58] Field of Search ................. 95/31; 354/173, 204

[56] References Cited
UNITED STATES PATENTS
3,598,034   8/1971   Suzuki ................................... 95/31
3,688,669   9/1972   Ogiso..................................... 95/31

*Primary Examiner*—John M. Horan
*Attorney, Agent, or Firm*—Wolder & Gross

[57] ABSTRACT

A motor driven camera operating mechanism includes a current source, an electric drive motor and a reversible transmission coupling including a disengagable clutch coupling the motor to the film take-up, the shutter cocking mechanism and shutter release, the transmission being reversed upon a film increment advance and the shutter being released by the transmission reverse drive. There are provided a normally open manual first switch and three double throw switches, a second switch actuated by the increment advance of the film take-up, a third switch actuated by the shutter cocking and a fourth switch actuated by the transmission reverse rotation. The first switch first contact is connected to the battery first terminal and the third switch first contact and the first switch arm is connected to the second switch second contact, the arm of which is connected to a first terminal of the motor, the second terminal of which is connected to the battery other terminal. The arm of the third switch is connected to the second switch first contact, and its second contact is connected to the arm of the fourth switch whose first contact is connected to the third switch first contact and whose second contact is connected to the motor second terminal.

2 Claims, 6 Drawing Figures

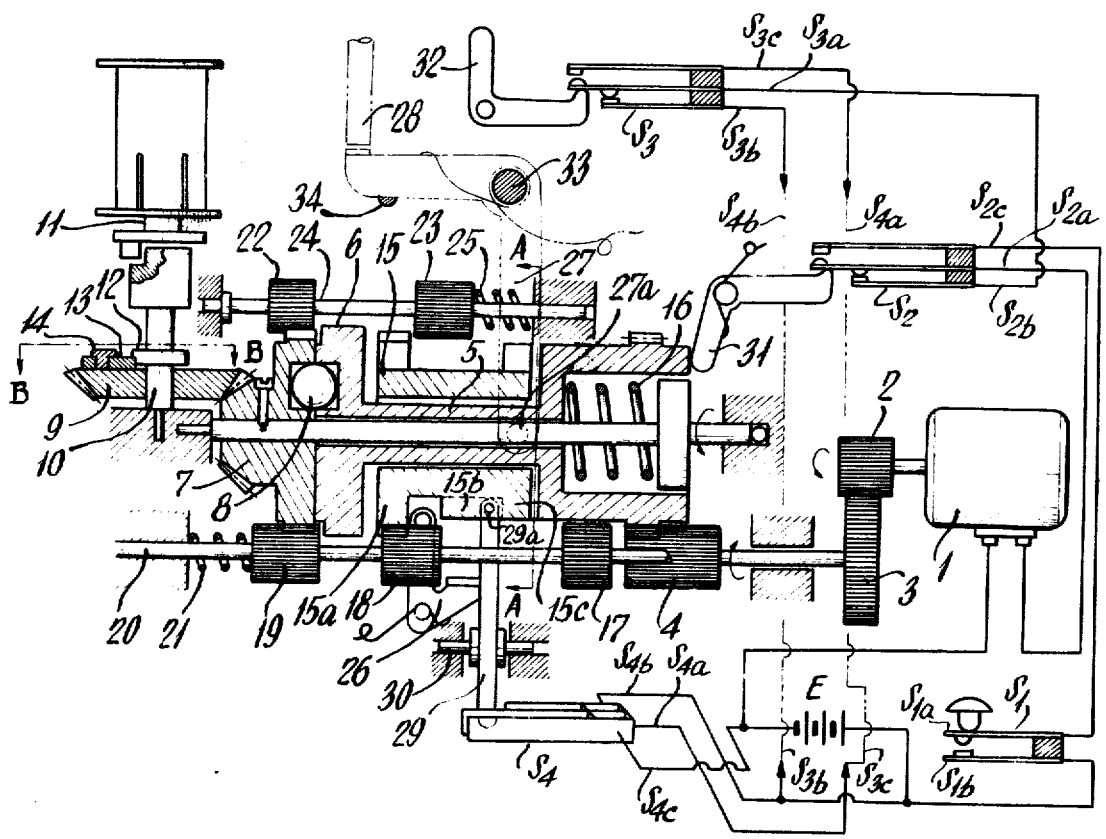
Fig-1
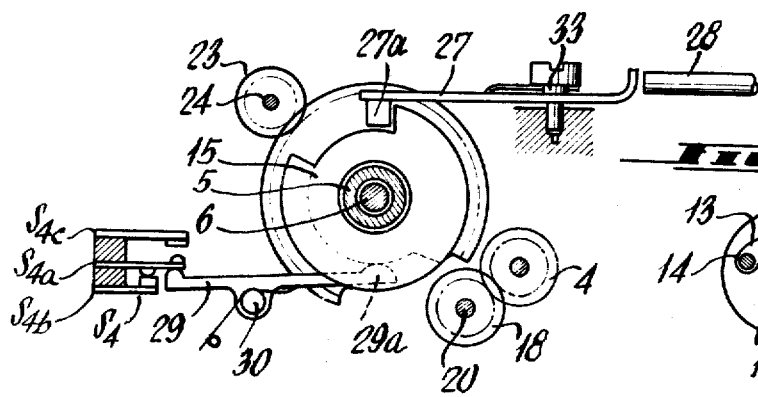
Fig-2A
Fig-2B

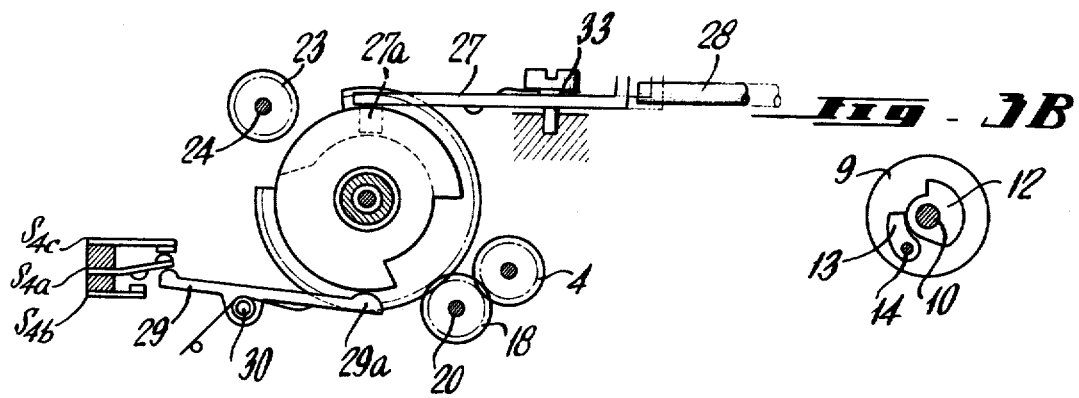
Fig. 3A
Fig. 3B
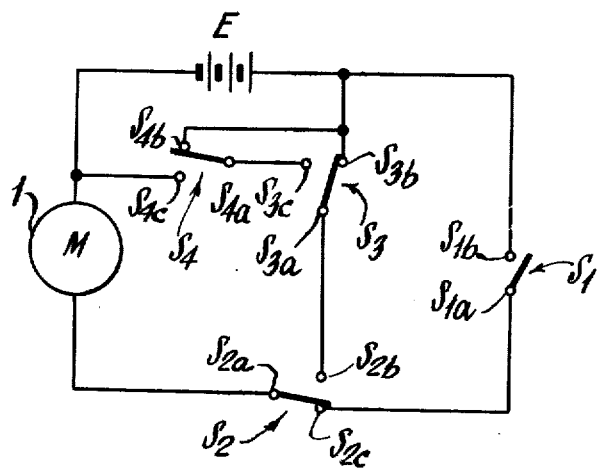
Fig. 4

MECHANISM AND NETWORK FOR EFFECTING THE SEQUENCING OF AN ELECTRIC MOTOR DRIVEN FILM ADVANCING SHUTTER COCKING AND RELEASE MECHANISM

BACKGROUND OF THE INVENTION

The present invention relates generally to improvements in cameras and it relates more particularly to an improved mechanism and network for effecting the sequencing of an electric motor driven film advancing, shutter cocking and release mechanism.

In camera automatic film take-up mechanisms which enable the user to perform successive photographing operations, a pause interval is necessary for the shutter action between the completion of the preparatory operations such as film advance or take-up and shutter charging by the driving power of an electric motor and start of the next film take-up action. If this pause interval is fixed and short, then the mechanism cannot be associated with long-time shutter actions; while if this pause interval is fixed and long, then a long time is required even for a cycle of short-time shutter action, so that the number of exposed film frames per unit time is decreased.

Under these circumstances there has been heretofore proposed, for obtaining suitable pause periods in accordance with the time of the shutter action, an arrangement which stops the current supply to the motor during the shutter action and further, and in order to avoid the power of inertia of the motor, there is provided a short-circuit arrangement for the motor so as to apply brake to the motor.

In order to also make a single-frame photographing operation possible, the successive photographing arrangement is generally provided with a film take-up circuit and a release action circuit and change-over of these is made upon completion of film take-up action and upon release action so that upon release of successive photographing operation change-over is made in the order of the release action circuit, the brake circuit and the film take-up circuit. This requires at least two switches and the actin is inevitably unstable owing to simultaneous operations.

SUMMARY OF THE INVENTION

It is a principal object of the present invention to provide an improved electric motor actuated camera.

Another object of the present invention is to provide a camera with an improved electric motor driven mechanism for automatically sequentially advancing the film a single frame, cocking the shutter and releasing the shutter.

Still another object of the present invention is to provide in a camera an improved electric motor actuated mechanism for advancing the film and cocking and releasing the shutter in which the operations are so related as to have a minimum cycling time sufficient to accommodate any exposure time.

A further object of the present invention is to provide a mechanism of the above nature characterized by its reliability, ruggedness, efficiency and high versatility.

the above and other objects of the present invention will become apparent from a reading of the following description taken in conjunction with the accompanying drawings which illustrate a preferred embodiment thereof.

In a sense the present invention contemplates providing in a camera including a film take-up, an electric motor, a shutter, a current and a transmission driven by the motor for actuating the film take-up and cocking and releasing the shutter, a motor control network comprising a normally open manually operable first switch, a second switch transferable from a first state to a second state in response to the completion of a film increment frame advance by the film take-up, a third switch transferable from a first state to a second state in response to the charging of a shutter, and a fourth switch transferable from a first to a second state in response to the rotation of the motor following the completion of the film frame advance, the motor being energized in response to either said second and third switches being in their first states or said second, third and fourth switches being in their first, second and first states respectively, or said first switch being closed and said second switch being in its second state, and said motor being short circuited by said second, third and fourth switches being in their first, second and third states respectively.

In the preferred form of the improved network each of the second third and fourth switches includes first and second contacts and an arm transferable between the contacts. A first motor terminal is connected to a first current source terminal the second current source terminal being connected through the first switch to the second contact of the second switch whose arm is connected to the motor second terminal. The second switch first contact is connected to the arm of the third switch whose first contact is connected to the current source second terminal and to the fourth switch first contact and whose second contact is connected to the arm of the fourth switch whose second contact is connected to the motor first terminal.

The improved mechanism and network effects the optimum switch transfer sequence so that a precise motor braking action is achieved so as to obtain optimum synchronization with the shutter operation with short and very long shutter exposure times.

BRIEF DESCRIPTION OF THE DRAWINGS

FIG. 1 is a front elevational view, partially broken away of a mechanism and a schematic diagram of the associated network of a preferred embodiment of the present invention;

FIG. 2A is a sectional view taken along Line A—A in FIG. 1;

FIG. 2B is a sectional view taken along line B—B in FIG. 1;

FIG. 3A is a view similar to FIG. 2A but illustrated at the time of shutter release;

FIG. 3B is a view similar to FIG. 2B but illustrated at the time of shutter release; and FIG. 4 is a schematic diagram of the electrical control network of the mechanism of FIGS. 1 to 3.

DESCRIPTION OF THE PREFERRED EMBODIMENT

Referring now to the drawings which illustrate a preferred embodiment of the present invention, the reference numeral 1 generally designates an electric drive motor and in the current supply circuit for the motor 1 a battery E there are provided an actuating normally open switch $S_1$, an automatic-manual circuit, double throw change-over switch $S_2$, a shutter synchronization double throw switch $S_3$ and a control double throw switch $S_4$. A hollow driving shaft 5 is rotatably supported by a coaxial shaft 6 and is axially movable and normally urged to the left by the action of a compression spring 16 which is entrapped between shaft 5 and the supporting shaft 6, and is connected to the motor 1 through a gear train including gears 2, 3 and 4. A bevel gear 7 is fixed to the shaft 6, and is provided at its inner end with a spur gear portion having a recess in its inner face for a steel ball 8, the recess and counterpart recess of the driving shaft 5 and the steel ball 8 constituting a ball clutch.

A bevel gear 9 engages the bevel gear 7 and is connected to the connecting shaft 10 of the film take-up shaft 11 of the camera through a pawl and ratchet arrangement 14. A pawl 13 is attached to the bevel gear 9, and cooperates with a ratchet wheel 12 which is fixed to the connecting shaft 10. A release ring 15 is rotatably engaged by coaxial driving shaft 5 and is provided with a gear section 15a, a switch section 15b and a release section 15c with respective cutout portions. To a transversely offset shaft 20 there are fixed three gears 17, 18 and 19; and the shaft 20 is urged to the right by a spring 21 and is releasably engaged by swingable stop member 26. The gear 19 normally engages the spur gear section of bevel gear 7, the gear 17 being so arranged as to engage the gear 4 when it is moved to the right and the gear 18 engaging the gear section 15a of release ring 15.

Gears 22 and 23 are fixed to a shaft 24 and the shaft 24 is urged to the left by a spring 25. The gear 22 normally engages the spur gear section of bevel gear 7 and the gear 23 is so arranged as to engage the gear section 15a of the release ring 15 when it moves to the right together with the driving shaft 5 moving to the right.

A release lever 27 is rotatably supported by a shaft 33, and is spring urged counterclockwise. The range of swinging movement of the lever 27 is restricted by a stop member 34. One end of the release lever 27 is positioned adjacent to the lower end of the shutter release pin 28 of the camera and the other end is provided with a pin section 27a so as to engage the release ring 15 and carry out the release action.

A lever 29 is rotatably supported by a pivot pin 30 and is spring urged counterclockwise as viewed in FIG. 2. One end of the lever 29 is positioned adjacent to the operating section or arm $S_{4a}$ of a double throw control switch $S_4$ while the other end is in contact with the switch section 15B of the release ring 15.

A switch lever 31 is pivoted to a stationary part of the camera casing and is spring urged clockwise as viewed in FIG. 1. One end of the lever 31 is in contact with the end surface of the driving shaft 5 while the other end is positioned adjacent to the operating section or arm $S_{2a}$ of an automatic-manual circuit change-over double throw switch $S_2$.

A switch lever 32 is in driving connection with a shutter set lever (not shown) in the camera and one end thereof is positioned adjacent to the operating section $S_{3a}$ of a shutter synchronization double throw switch $S_3$.

There are provided, in the switches $S_1$, $S_2$, $S_3$ and $S_4$ normally open contacts $S_{1a} - S_{1b}$, $S_{2a} - S_{2c}$, $S_{3a} - S_{3c}$ and $S_{4a} - S_{4c}$ and normally closed contacts $S_{2a} - S_{2b}$, $S_{3a} - S_{3b}$ and $S_{4a} - S_{4b}$.

Considering now the operation of the mechanism described above, of the four switches $s_1 - s_4$ only the actuating switch $S_1$ is manual, and change-over or transfer of the switches $S_2$, $S_3$ and $S_4$ is carried out in driving connection with the action of the mechanism. Thus, the film take-up operation has been completed before closure of the actuating switch $S_1$, and since the explanation may start at any point of the operation, the following description will be made of the operation starting from the state as shown in FIG. 1.

FIGS. 1 and 2 show the state under film take-up operation, in which state an automatic current supply circuit ($E + - S_{3b} - S_{3a} - S_{2b} - S_{2a} - M - E -$) is established, so that the motor (M) is in operation independent of the operation of the actuating switch $S_1$. The speed of the operation of the motor 1 is reduced by the gears 2, 3 and 4 and then the drive is transmitted to the driving shaft 5. The drive is then transmitted through the ball 8, the bevel 7 and 9, the pawl and ratchet arrangement 14, the shaft 10 and the take-up shaft 11 of the camera, thus performing film take-up or advance action. At the same time, preparatory operations for photographing action such as shutter setting or charging is carried out by a known mechanism (not shown) of the camera. Then, change-over of the switch $S_3$ is carried out by the switch lever 32 which is in driving connection with shutter setting action. However, the second automatic current supply circuit ($E + - s_{4b} - S_{4a} - S_{3c} - S_{3a} - S_{2b} - S_{2a} - M - E -$) is established and the motor 1 remains in operation.

When one frame portion or increment of the film has been taken up, the take-up shaft 11 stops owing to action of the conventional camera mechanism, so that the coupling shaft 10 and the bevel gears 9 and 7 stop. Accordingly, at the ball-clutch section, the driving shaft 5 rides on the still ball 8 which has been in the recess at the end portion thereof against the action of the spring 16, so that the driving shaft 5 moves to the right and is disengaged from the bevel gear 7. At this time, owing to this movement of the driving shaft 5, the switch lever 31 is swung counterclockwise and operates the automatic-manual circuit change-over switch $S_2$. As a result, current supply to the motor 1 is stopped and operation of the motor is stopped. At the same time, the gear 23 engages the gear portion 15a of the release ring 15. Further, the stop member 26 disengages the supporting shaft 20, so that owing to action of the spring 21, the gear 17 moves to the right and engages the gear 4.

When the actuating switch $S_1$ is closed, there is established a manual current supply circuit $E + - S_{1b} - S_{1a} - S_{2c} - S_{2a} - M - E -$ and the motor 1 is actuated. The drive shaft 5 is rotated through the transmission system but its rotation is not transmitted to the bevel gear 7. However, the drive of the motor 1 is transmitted through the gears 2, 3, 4, 17 and 19 and the spur gear portion of the bevel gear 7, tending to rotate the bevel gear 7 in the reverse direction. The drive is further transmitted to the bevel gear 9 which, then, owing to the pawl and ratchet arrangement 14, makes idle rotation relative to the coupling shaft 10.

In the meantime, since the gear 23 is in engagement with the gear portion 15a of the release ring 15, the release ring 15 is rotated in a direction which is the reverse to that of the driving shaft 5, clockwise as viewed in FIG. 2, so that the release ring gear portion 15a, which has been out of engagement owing to the cutout portion, is brought into engagement with the gear 18. Further, the release ring switch portion 15b causes the lever 29 to be swung clockwise, as viewed in FIG. 2, so that a change-over of the control switch $S_4$ is made. However, the action of the control switch $S_4$ has no relation with the manual current supply circuit so that the motor 1 remains in operation. Further, since, with the release lever 27 in its stopped state, the release ring 15 has moved, together with the driving shaft 5 to the right, as viewed in FIG. 1, the release ring release portion 15c does not in its movement come in engagement with the pin 27a of the release lever.

When the bevel gear 7 has rotated a certain angle determined in accordance with the numbers of the teeth of the gears so that the relative angle of rotation between the bevel gear 7 and the driving shaft 5 reaches 360°, then the ball-clutch again enters a coupling state. Up to that time, the release ring 15 has rotated a certain angle determined by the numbers of teeth of the gears, and in the same manner, in the pawl and ratchet arrangement 14 a reversed idle rotation has been made by a certain angle. In FIG. 3, an angle of about 150° is shown for the release ring 15, and an angle of about 90° for the pawl 13.

When the ball-clutch enters its coupling state, owing to action of the spring 16, the drive shaft 5 and the release ring 15 move to the left, as viewed in FIG. 1. The left end surface of the driving shaft 5 causes the gear 19 to be moved to the left and the stop member 26 returns so that the shaft 20 is engaged. The release lever pin 27a is pushed by the release ring release portion 15c so that the release lever 27 is swung clockwise and the release pin 28 is thus pushed so that the shutter of the camera is actuated. At the same time, the switch lever 31 swing in a return clockwise direction so that the automatic-manual change-over switch $S_2$ returns to its initial state. As a result, there is established a motor braking short-circuit $S_{2b} - S_{3a} - S_{3c} - S_{4a} - s_{4c} - M - S_{2a} - s_{2b}$ so that the motor 1 is rapidly stopped.

During this stoppage, shutter action of some time duration is performed. Completion of shutter action causes the shutter set lever to be returned, and also the switch lever 32 and the shutter synchronization switch $S_3$ are returned. Accordingly, there is again established the aforementioned first automatic current supply circuit $E + - S_{3b} - S_{3d} - S_{2b} - S_{2a} - M - E -$ so that the motor 1 is energized and starts to operate.

The drive power of the motor 1 is transmitted, as mentioned before, through the gears 2, 3 and 4, the driving shaft 5, and the bevel gears 7 and 9, and after the idle rotation of the pawl and ratchet arrangement 14, film advance or winding-up operation is carried out. In the meantime, owing to engagement of the gear 18 and the release ring gear portion 15a, the release ring 15 rotates in normal direction, counterclockwise, as viewed in FIG. 3, the lever 29 returns in a swinging movement in a counterclockwise direction, and the control switch $S_4$ also returns. However, the change-over of the switch $S_4$ has no relation to the automatic current supply circuit so that the motor 1 continues to operate. Further rotation causes the release lever pin 27a to fall into the cutout portion of the release ring release section 15c, so that the release lever 27 returns in a swinging movement in counterclockwise direction, as viewed in FIG. 1, and the release pin 28 returns to its retracted position. Then, the cutout portion of the release ring gear portion 15a reaches the gear 18 so that disengagement is carried out, and the release lever pin 27a engages the release ring 15. Further rotation causes engagement of the ratchet 14, and the film winding-up operation is carried out.

If the actuating switch $S_2$ remains closed, the above mentioned operation is repeated. When the switch $S_2$ is opened, stopping occurs upon completion of the winding-up operation.

The above mentioned operation is schematically shown in the following table:

TABLE

| | | |
|---|---|---|
| Film Winding-Up Completed → | →$S_2$ Change-Over | (Automatic → Manual Current Supply Circuit) |
| $S_1$ Closed | →Motor Stop ←Motor | (If $S_1$ remains closed, motor is not stopped and continues to operate.) |
| Idle Reverse Rotation of Bevel Gear 9 owing to Action of Bevel Gear 7 and Reverse Rotation Ratchet 14. | →$S_4$ Change-Over | (Preparation for Brake Circuit) |
| | →Ball Clutch Coupled $S_2$ Change-Over | |
| Shutter Action | | (Manual Current Supply Circuit → Brake Circuit) |
| | Release Pin 28 Pushed Motor Rapidly Stopped | |
| Completed | →$S_3$ Change-Over (Motor Actuation | (Brake Circuit → Automatic Current Supply Circuit) |
| Recovery of Ratchet Idle Rotation | →Release Pin 28 Returns →$S_1$ Change-Over | (Preparation for $S_3$ Change-Over) |
| | →Release Ring 15 Stops →Ratchet 14 Engages | |
| Film Winding-Up Start | →$S_3$ Change-Over | (Automatic → Automatic Current Supply Circuit) |
| Film Winding-Up Completed | Ball Clutch Disengagement →$S_2$ Change-Over | (Automatic → Manual Current Supply Circuit) |

As explained above, according to the present invention, change-over switches are added to a conventional film winding-up arrangement so that a positive brake action can be accomplished, high-speed successive photographing operation and long-time shutter can be performed and single-frame and bulb photographing operations can be carried out, thus providing many great advantages.

While there has been described and illustrated a preferred embodiment of the present invention it is apparent that numerous alterations, omissions and additions may be made without departing from the report thereof.

I claim:

1. A successively photographing camera of the automatic film transport type comprising
   a. a film transport member;
   b. a shutter release member;
   c. an electric motor;
   d. a transmission driven by said motor and effecting film transport, shutter charge and release;
   e. a power source;
   f. a motor control network for connecting said power source to said motor and including a manual energization circuit for actuating said shutter release member, first and second automatic energization circuits for actuating said film transport member and for stopping said motor;
   g. a normally opened switch selectively closable to establish said manual energization circuit and thereby effect the operation of the motor and said shutter release member, during film take-up said motor being in operation independent of the operation of said normally opened switch;
   h. a first selector switch having contact means transferrable between a first position at which said manual energization circuit is established and a second position at which said first and second automatic energization circuit is established and transferrable from its second position to its first position in communication with and responsive to said transmission at the end of film transport and from its first position to its second position in communication with and responsive to said transmission at the end of shutter release;
   i. a second selector switch having contact means transferrable between a first position at which said first automatic energization circuit is established and a second position at which said second automatic energization circuit is established, said contact means being in communication with said shutter charge member and transferrable from its said first position to its second position in response to said shutter charge member during film transport and transferrable from its second position to its first position upon completion of the shutter operation; and
   j. a third selector switch having contact means transferrable between a first position at which said second automatic energization circuit is established and a second position wherein the motor is short circuited so as to stop and transferrable from its first position to its second position in communication with and responsive to said transmission during the interval between completion of film transport and the shutter release and from its second position to its first position in communication with and responsive to the transmission during the interval between the shutter release and the changeover of said switch from its first position to its second position as film transport starts whereby upon completion of the shutter release operation the first automatic energization circuit is formed to start the film winding operation, during the film winding operation the transfer of the contact means of the second selector switch is effected to form the second automatic energization on circuit so as to continue the film winding operation and then upon completion of the film winding operation transfer of the contact means of the first selector switch is effected so as to stop the motor.

2. The camera of claim 1 wherein each of said second, third and fourth switches includes first and second contacts and said contact means of each switch is an arm transferable between the contacts, a first terminal of said motor being connected to a first terminal of said current source, the second terminal of said current source being connected through said first switch to the second contact of said second switch, the arm of said second switch being connected to the second terminal of said motor, the first contact of said second switch being connected to the arm of said third switch, the first contact of said third switch being connected to said current source second terminal and to the first contact of said fourth switch, the second contact of said third switch being connected to the arm of said fourth switch and the second contact of said fourth switch being connected to said motor first terminal.

* * * * *